Aug. 14, 1951     W. F. MENGEL     2,564,020
VEHICLE FOR HAULING AND DISPENSING MATERIAL
Filed Feb. 13, 1950     3 Sheets-Sheet 1
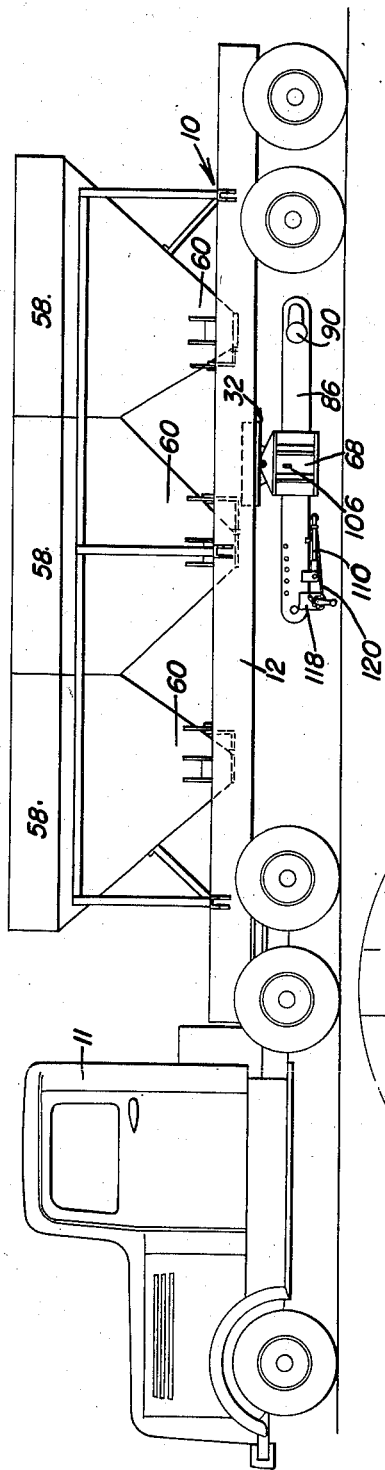
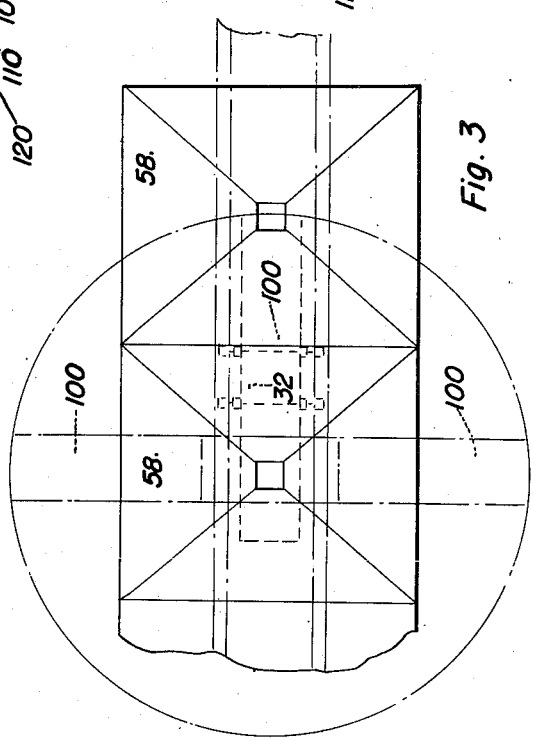
William F. Mengel
INVENTOR.

Aug. 14, 1951    W. F. MENGEL    2,564,020
VEHICLE FOR HAULING AND DISPENSING MATERIAL
Filed Feb. 13, 1950    3 Sheets-Sheet 2

William F. Mengel
INVENTOR.

Aug. 14, 1951 W. F. MENGEL 2,564,020
VEHICLE FOR HAULING AND DISPENSING MATERIAL
Filed Feb. 13, 1950 3 Sheets-Sheet 3

William F. Mengel
INVENTOR.

BY Clarence A. O'Brien
and Harvey B. Jacobson
Attorneys

Patented Aug. 14, 1951

2,564,020

UNITED STATES PATENT OFFICE 2,564,020

VEHICLE FOR HAULING AND DISPENSING MATERIAL

William F. Mengel, Wisconsin Rapids, Wis.

Application February 13, 1950, Serial No. 143,901

8 Claims. (Cl. 214—83.26)

This invention relates to new and useful improvements in material carrying vehicles and the primary object of the present invention is to provide a vehicle for hauling and dispensing, through the use of gravity fed hoppers, material such as gravel, coal, cement, grain or any bulky material that flows by gravity.

Another very important object of the present invention is to provide a vehicle for hauling and dispensing material including a wheeled frame supporting a plurality of hoppers thereon together with a carriage slidable on the frame and holding a delivery funnel that is movable beneath a selected one of the hoppers.

Yet another important object of the present invention is the provision of a material carrying machine including a carriage that is movable beneath a selected one of a gang of hoppers and supporting a conduit, and a conveyor frame mounted for swinging, sliding and rotary movement on the carriage so that material may be delivered to hauling vans or the like disposed adjacent the machine.

A further object of the present invention is to provide a device for dispensing material including a group of elements that are quickly and readily applied to or removed from the chassis of a semi-trailer in a convenient manner.

A still further aim of the present invention is to provide an apparatus of the aforementioned character that is simple and practical in construction, strong and reliable in use, relatively small and compact in structure, inexpensive to manufacture and install, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention;

Figure 2 is a rear elevational view of Figure 1 and showing the conveyor means swung to one side of the vehicle and the conveyor supporting leg lowered;

Figure 3 is a fragmentary plan view of Figure 1 and showing the swinging direction of the conveyor means relative to a hopper;

Figure 4:
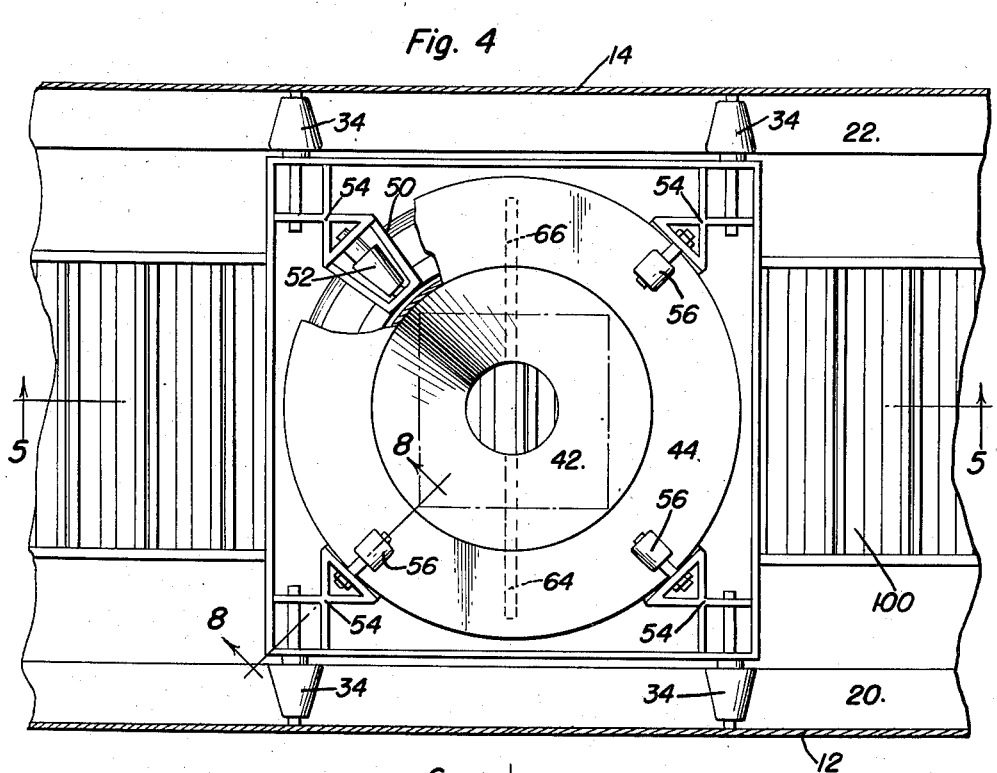
Figure 4 is an enlarged detail horizontal sectional view taken substantially on the plane of section line 4—4 of Figure 6 and with the hopper removed.
Figure 5:
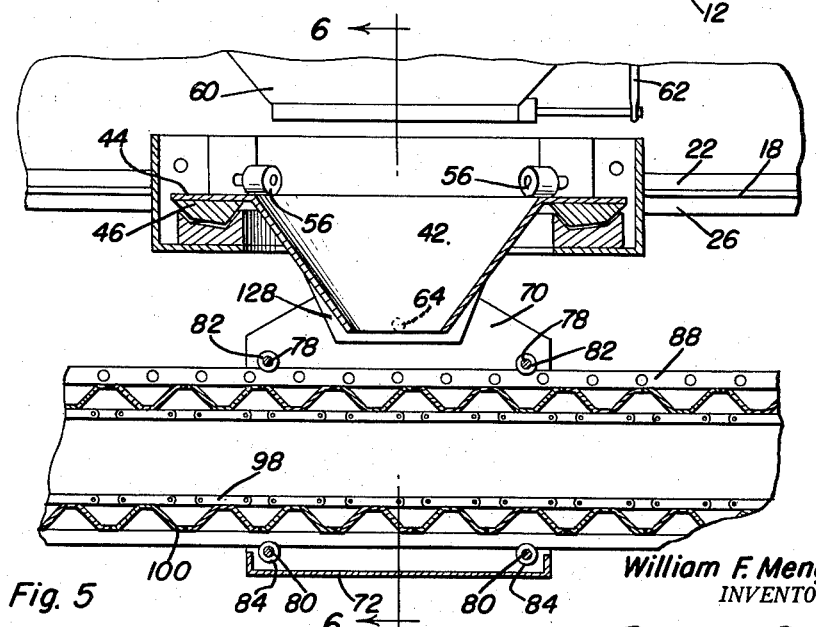
Figure 5 is a longitudinal vertical sectional view taken substantially on the plane of section line 5—5 of Figure 4 and showing the lower end of a hopper in elevation.

Referring now to the drawings in detail, wherein for the purpose of illustration, there is disclosed a preferred embodiment of the present invention, the numeral 10 represents a wheeled frame generally, that is, preferably the chassis of a semi-trailer 11. The frame 10 includes a pair of spaced parallel channel-shaped side members 12 and 14 having lower horizontal flanges 16 and 18.

Figure 6:
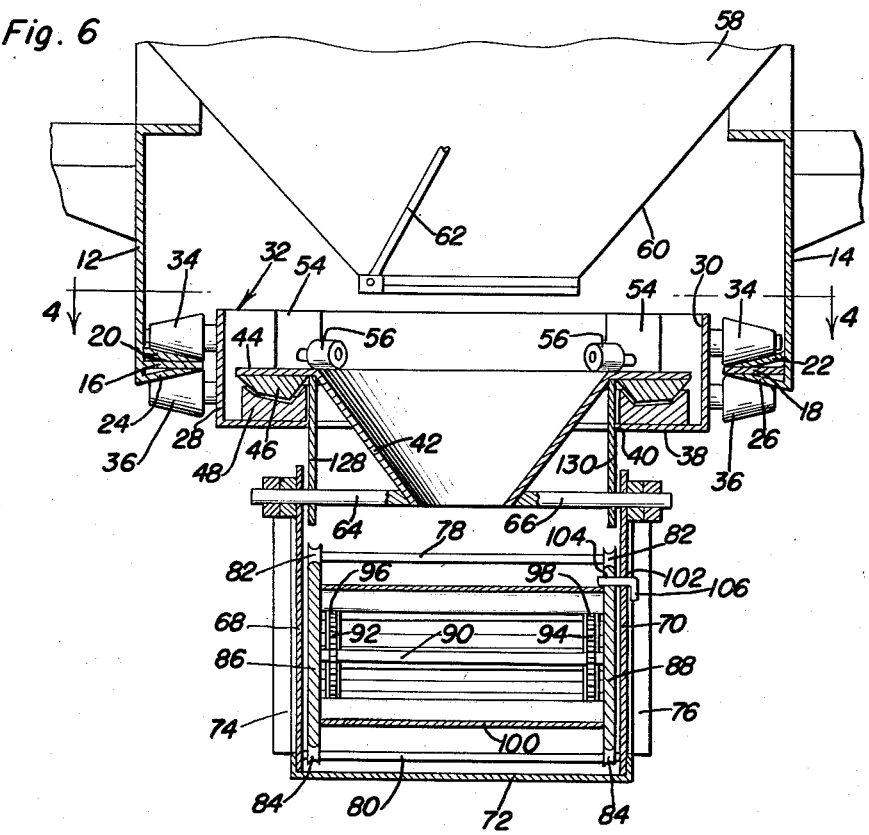
Figure 6 is a transverse vertical sectional view taken substantially on the plane of section line 6—6 of Figure 5.
Figure 7:
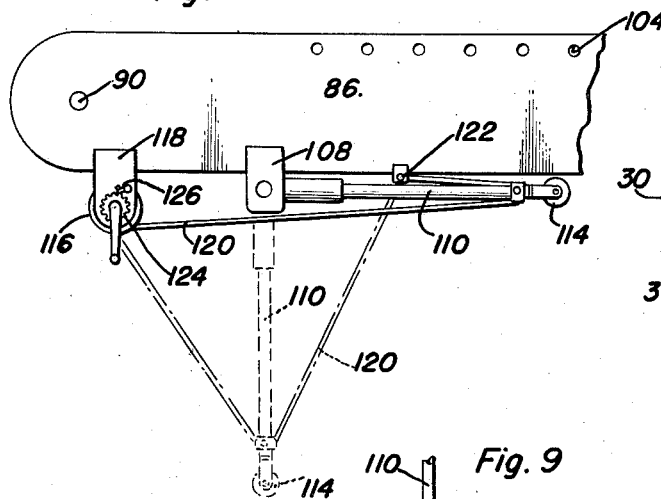
Figure 7 is a fragmentary elevational view of the conveyor frame and showing the supporting leg lowered, in dotted lines.
Figure 8:
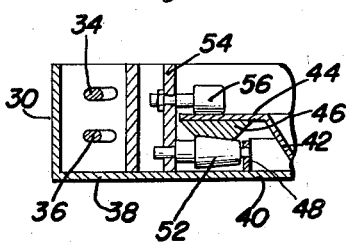
Figure 8 is a vertical sectional view taken substantially on the plane of section line 8—8 of Figure 4.
Figure 9:
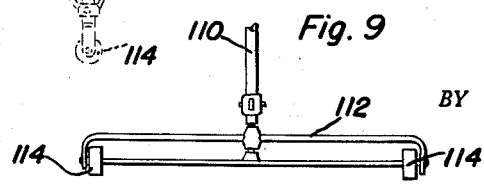
Figure 9 is an elevational view of the lower end of the conveyor supporting leg.

Downwardly and inwardly inclined guide tracks or strips 20 and 22 are suitably secured to the upper faces of the flanges 16 and 18, whereas upwardly and inwardly inclined guide tracks or strips 24 and 26 are suitably secured to the lower faces of the flanges 16 and 18, as shown best in Figure 6 of the drawings.

The side walls 28 and 30 of a carriage 32 support upper and lower pairs of substantially conical rollers or anti-friction members 34 and 36 that track upon the plates 20, 22 and 24, 26. The bottom wall 38 of the carriage 32 is provided with a circular opening 40 that receives a frusto-conical conduit or funnel 42 having a horizontal flanged portion 44 at its major end. The under surface of the flanged portion 44 supports a reinforcing and strengthening ring 46.

A circular guide channel 48 is fixed to the bottom wall 38 of the carriage 32, about the opening 40, and underlies the ring 46. The channel 48 is provided with a plurality of circumferentially spaced radial slots or recesses 50 that receive anti-friction members or rollers 52 upon which the ring 46 rides to permit rotation of the funnel 42 about the carriage 32.

Diagonal support brackets 54 are mounted at the corners of the carriage 32, support the upper and lower rollers 34, 36, the rollers 52 and further rollers 56 that contact the flanged portion 44.

A plurality of hoppers or material receiving bins 58 having downwardly sloping reduced lower ends 60, are suitably mounted on the frame 10. The ends 60 are formed with openings and suitable valves 62 are actuated to permit material to exit from the hoppers. The carriage 32 is movable on the guide tracks beneath a selected one of the hoppers and the major end of the conduit 42 is slightly larger than the openings in the ends 60 of the hoppers to prevent the lossage of material as the material passes from a hopper into the conduit 42. The lower ends of the hoppers are also located above the carriage to permit unrestricted sliding movement of the carriage between adjacent movement of the carriage between adjacent hoppers.

A pair of coaxial trunnions 64 and 66 project horizontally from the conduit 42 and swingably support depending side members 68 and 70 thereon. The lower ends of the side members 68 and 70 are joined and strengthened by a bottom wall 72 and the side members 68 and 70 are further strengthened and reinforced by ribs 74 and 76.

Upper and lower pairs of connecting and bracing rods 78 and 80 are terminally secured to the side members 68 and 70. Upper and lower pulley-type rollers 82 and 84 are received on the rods 78 and 80 and slidably receive the upper and lower edges of conveyor-frame forming members 86 and 88. There are a sufficient number of the upper and lower rollers 82 and 84 to support and to permit sliding of the members 86 and 88 but the members 86 and 88 cannot swing relative to the side members 68 and 70.

A group of sprocket holding shafts 90 are mounted on the members 86 and 88 and each carry a pair of sprockets 92 and 94. An endless chain 96 is trained about the sprockets 92 of each shaft 90, and a further sprocket chain 98 is trained about the sprockets 94 of each shaft 90. An endless conveyor belt 100, preferably of the undulated type, surrounds and is suitably secured to the chains 96 and 98.

Any suitable power means may be employed for rotating one or more of the shafts 90 to effect a rotation of the chains 96 and 98 and the conveyor 100, such as a small motor having a driving connection with at least one of the shafts 90.

The side members 68, 70 are provided with openings 102 for registering with one of a plurality of longitudinally spaced openings 104 in the members 86, 88. Locking pins 106 are inserted into registering openings 102 and 104 to retain the conveyor frame adjusted longitudinally of the side members 68, 70.

A bracket 108 is supported on the members 86, 88 and pivotally supports a supporting leg 110 having a lower cross portion 112 that carries wheels 114. A cable drum 116 is journaled for rotation on a bracket 118 carried by the members 86, 88 and receives one end of a cable 120 the other end of which is attached, as at 122, to the member 86. The cable 120 is also suitably secured to the leg 110. A ratchet 124 and pawl 126 is associated with the supporting shaft of the drum 116 to prevent accidental back rotation of the drum 116.

As the drum 116 and ratchet 124 are rotated in one direction, the leg 110 is lowered to support the conveyor frame in an elevated position, whereas rotation of the drum 116 and ratchet 124 in the opposite direction will effect a raising of the leg 110.

To further strengthen and support the side members 68, 70 and the trunnions 64, 66, reinforcing plates 128 and 130 mounted on the trunnions 64, 66 are suitably fixed to the flanged portion 44, as shown best in Figure 6 of the drawings.

In practical use of the present invention, the hoppers are filled with any suitable material, such as coal, sand, gravel cement or the like, and the vehicle is moved to a point where the material is to be discharged.

The carriage 32 is then moved beneath the delivery end 60 of a selected hopper, and at the same time the conveyor is rotated at a selected angle at either side of frame 10. The leg 110 is lowered to support the head end of the conveyor and the pin or pins 106 are removed to permit placement of the conveyor at a desired length. The pin or pins 106 are then replaced and the leg 110 is either raised or lowered to support the conveyor at the desired height.

The valve 62 is opened to permit material to pass through the conduit 42 and onto the conveyor 100 and the power means for the conveyor is started to rotate the conveyor and dispense material thereon.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A vehicle for hauling and dispensing material, said vehicle comprising a wheeled frame including a pair of side members, hoppers supported on said frame and having discharge ends, a carriage slidably carried by said side members for movement under the discharge end of a selected hopper, a conduit mounted on said carriage for rotation, a support pivotally carried by and disposed directly beneath the conduit and rotatable with the conduit, a conveyor frame slidably carried by said support and underlying said conduit, a supporting leg pivoted to the conveyor frame, and means mounted on the conveyor frame for lowering the leg to support the conveyor frame in an inclined position.

2. A vehicle for hauling and dispensing material, said vehicle comprising a wheeled frame including a pair of side members, hoppers supported on said frame and having discharge ends, a carriage slidably carried by the side members for movement under the discharge end of a selected hopper, a conduit mounted on said carriage for rotation, a support totally carried by the conduit and rotatable with the conduit, a conveyor frame slidably carried by said support and underlying said conduit, a supporting leg pivoted to the conveyor frame, and means mounted on the conveyor frame for lowering the leg to support the conveyor frame in an inclined position, said means including a flexible element having one end attached to the conveyor frame, a drum journaled for rotation on the conveyor frame and receiving the other end of said flexible element said flexible element being attached to said leg.

3. A vehicle for hauling and dispensing material, said vehicle comprising a wheeled frame including a pair of side members, a gang of hoppers supported on said wheeled frame, guide tracks carried by said side members, a carriage having anti-friction means tracking on said tracks for movement of said carriage beneath a selected one of said hoppers, a delivery conduit mounted for rotation on said carriage, and means carried by said conduit for delivering material leaving the conduit to a discharge point, said carriage including a bottom having an opening receiving said conduit, an annular guide channel surrounding the opening in said bottom wall, said conduit having a horizontal flanged portion overlying said guide channel, said guide channel having a plurality of circumferentially spaced recesses therein, and anti-friction members received in said recesses and supporting said flanged portion above said guide channel.

4. A vehicle for hauling and dispensing material, said vehicle comprising a wheeled frame including a pair of side members, a gang of hoppers supported on said wheeled frame, guide tracks carried by said side members, a carriage having anti-friction means tracking on said tracks for movement of said carriage beneath a selected one of said hoppers, a delivery conduit mounted for rotation on said carriage, and means carried by said conduit for delivering material leaving the conduit to a discharge point, said means including a pair of coaxial trunnions projecting horizontally from said conduit, a pair of side supports mounted on and depending from said trunnions, upper and lower groups of rollers carried by said side supports, and a conveyor frame slidably mounted between said upper and lower groups of rollers.

5. The combination of claim 4, and means locking the conveyor frame to the side supports and preventing sliding movement of the conveyor frame relative to said side supports.

6. The combination of claim 5, wherein said locking means includes removable pins, said side supports and said conveyor frame having registering openings therein receiving said pins.

7. In a vehicle for hauling and dispensing material including a pair of side members, a gang of hoppers supported on the vehicle and each including a lower discharge end and guide tracks mounted on the side members and extending beneath the lower discharge ends of the hoppers; a carriage having anti-friction means tracking on said guide tracks for movement of the carriage beneath a selected one of the hoppers, said carriage having an opening therein, a conduit including an upper end positioned through the opening for rotation, said upper end having an outwardly turned flange, an annular guide channel secured to the carriage about the opening and underlying said flange, said guide channel having a plurality of circumferentially spaced recesses therein, anti-friction members positioned in the recesses and supporting said flange above the guide channel, rollers carried by the carriage above the flange and contacting the flange, and means carried by the conduit for delivering material leaving the conduit to a discharge point.

8. The combination of claim 4 wherein said guide tracks each include a downwardly and inwardly inclined upper surface and an upwardly and inwardly inclined lower surface, the anti-friction means of said carriage including upper beveled rollers riding on the upper surfaces of said tracks and lower beveled rollers riding on the lower surfaces of said tracks.

WILLIAM F. MENGEL.

REFERENCES CITED

The following references are of record in the file of this patent:

UNITED STATES PATENTS

| Number | Name | Date |
|---|---|---|
| 1,050,889 | White | Jan. 21, 1913 |
| 1,333,378 | Bickley et al. | Mar. 9, 1920 |
| 2,107,682 | Wall | Feb. 8, 1938 |
| 2,275,799 | Oklejas | Mar. 10, 1942 |
| 2,277,416 | Rutten | Mar. 24, 1942 |
| 2,293,486 | Barrett | Aug. 18, 1942 |

FOREIGN PATENTS

| Number | Country | Date |
|---|---|---|
| 395,411 | Great Britain | July 17, 1933 |